Figure 9:
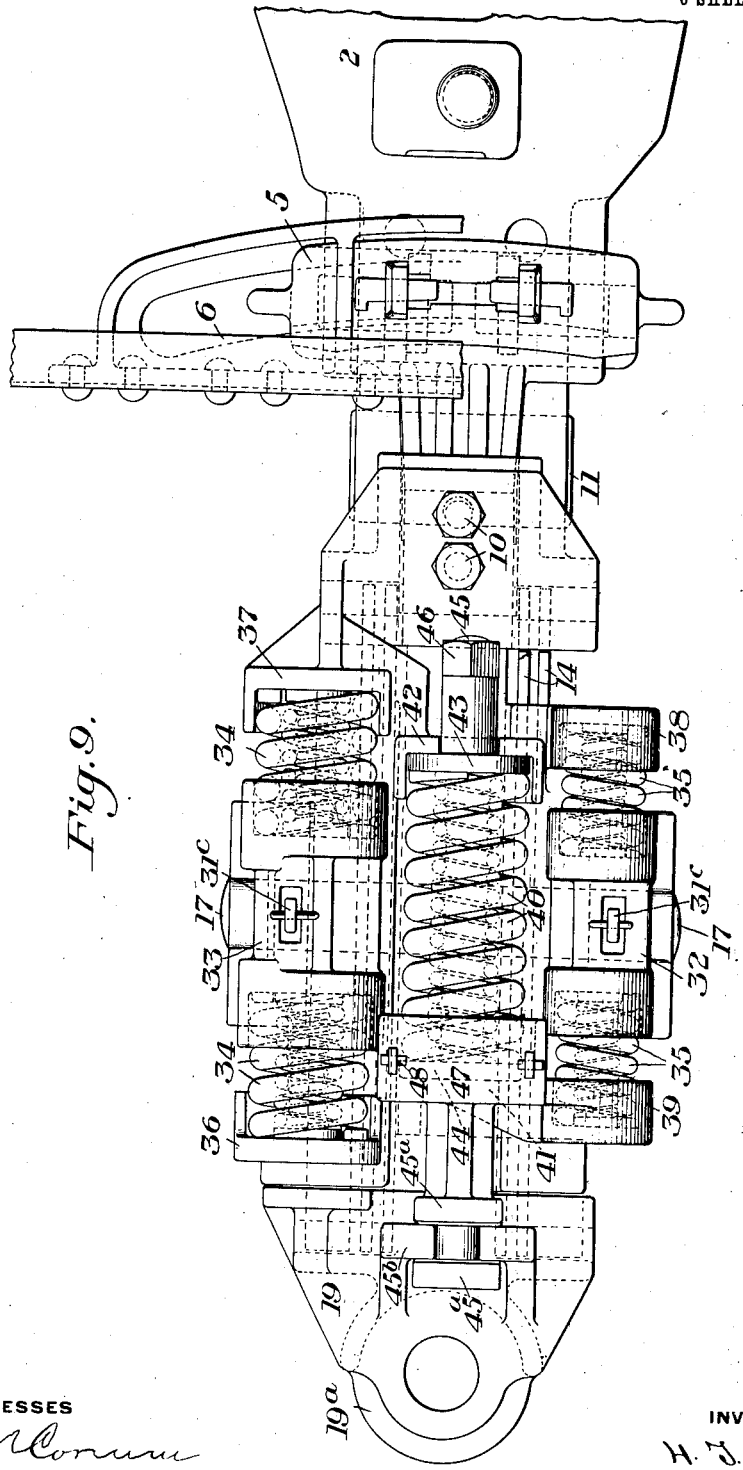

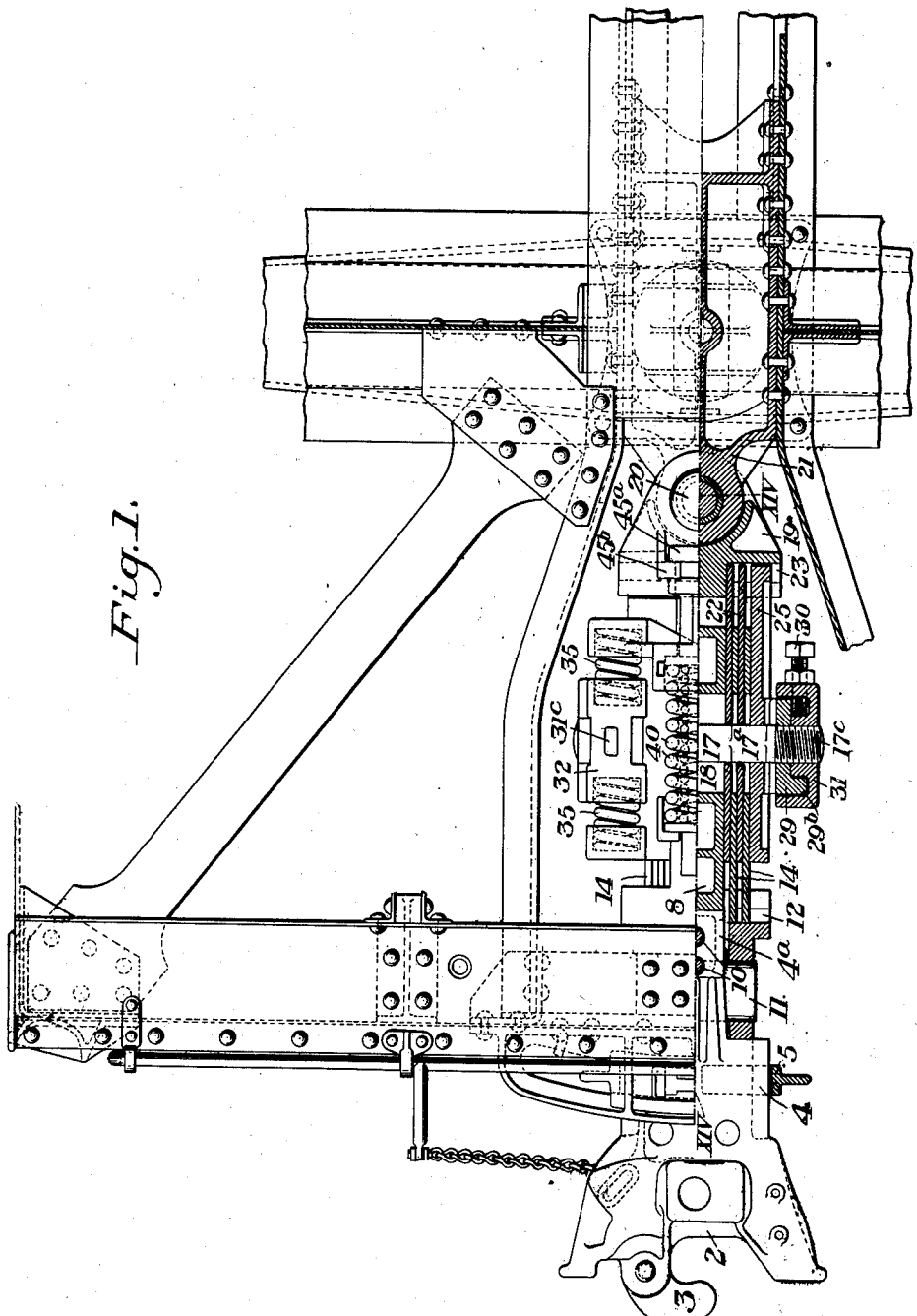

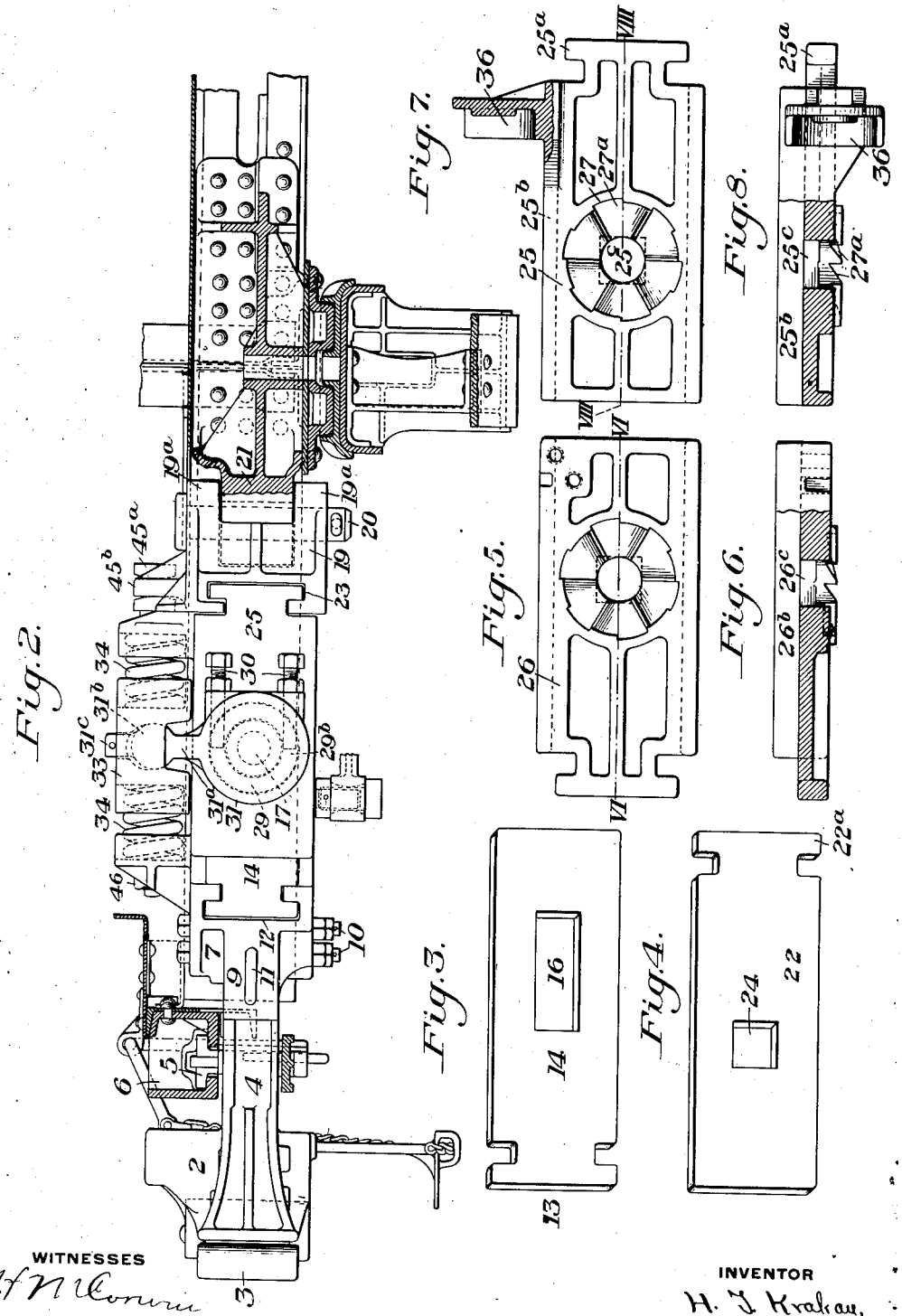

H. T. KRAKAU.
COUPLING BRAKE OR DRAFT RIGGING.
APPLICATION FILED JUNE 6, 1911.

1,063,699.

Patented June 3, 1913.
6 SHEETS—SHEET 3.

WITNESSES

INVENTOR

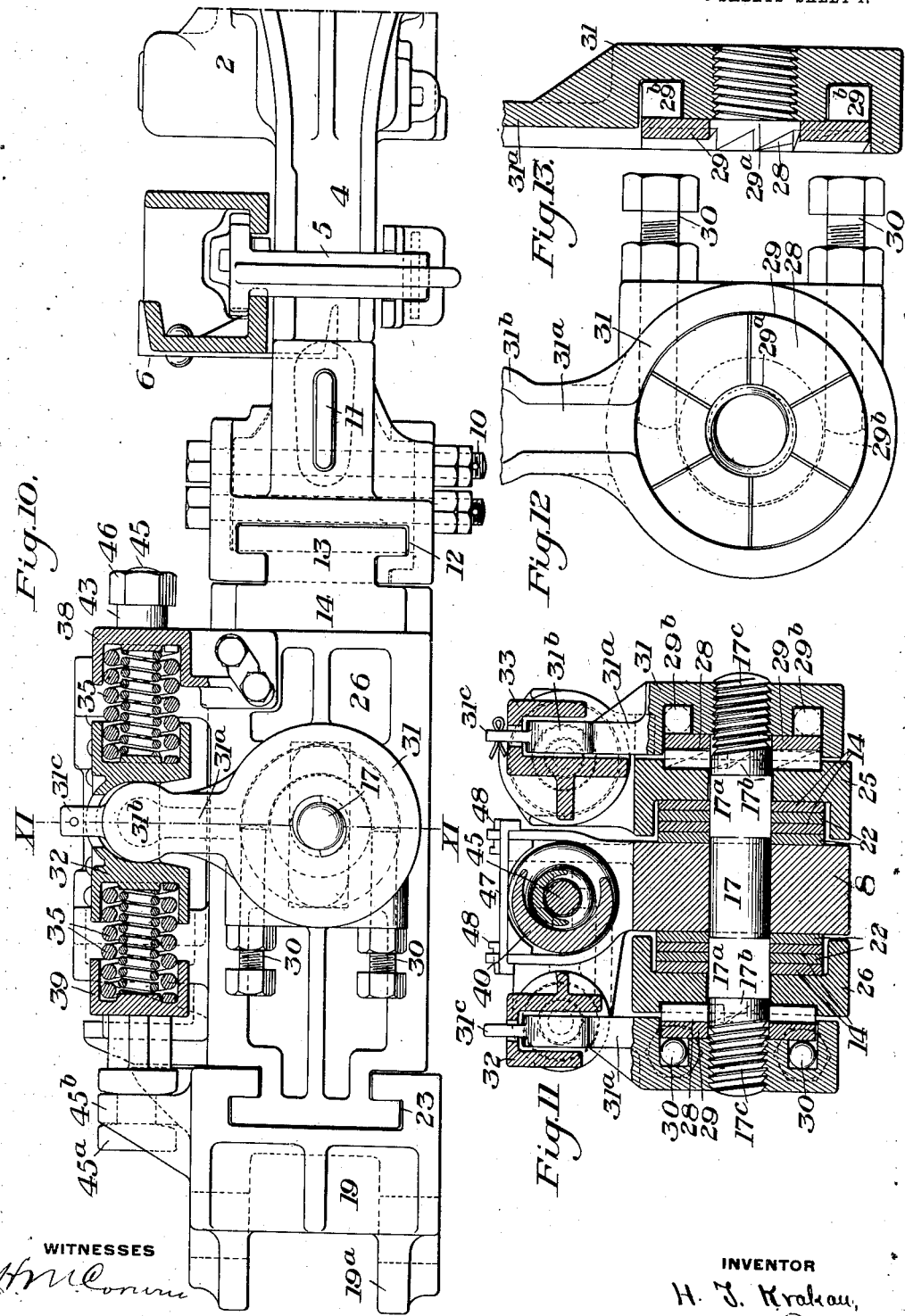

H. T. KRAKAU.
COUPLING BRAKE OR DRAFT RIGGING.
APPLICATION FILED JUNE 6, 1911.
1,063,699.
Patented June 3, 1913.
6 SHEETS—SHEET 5.
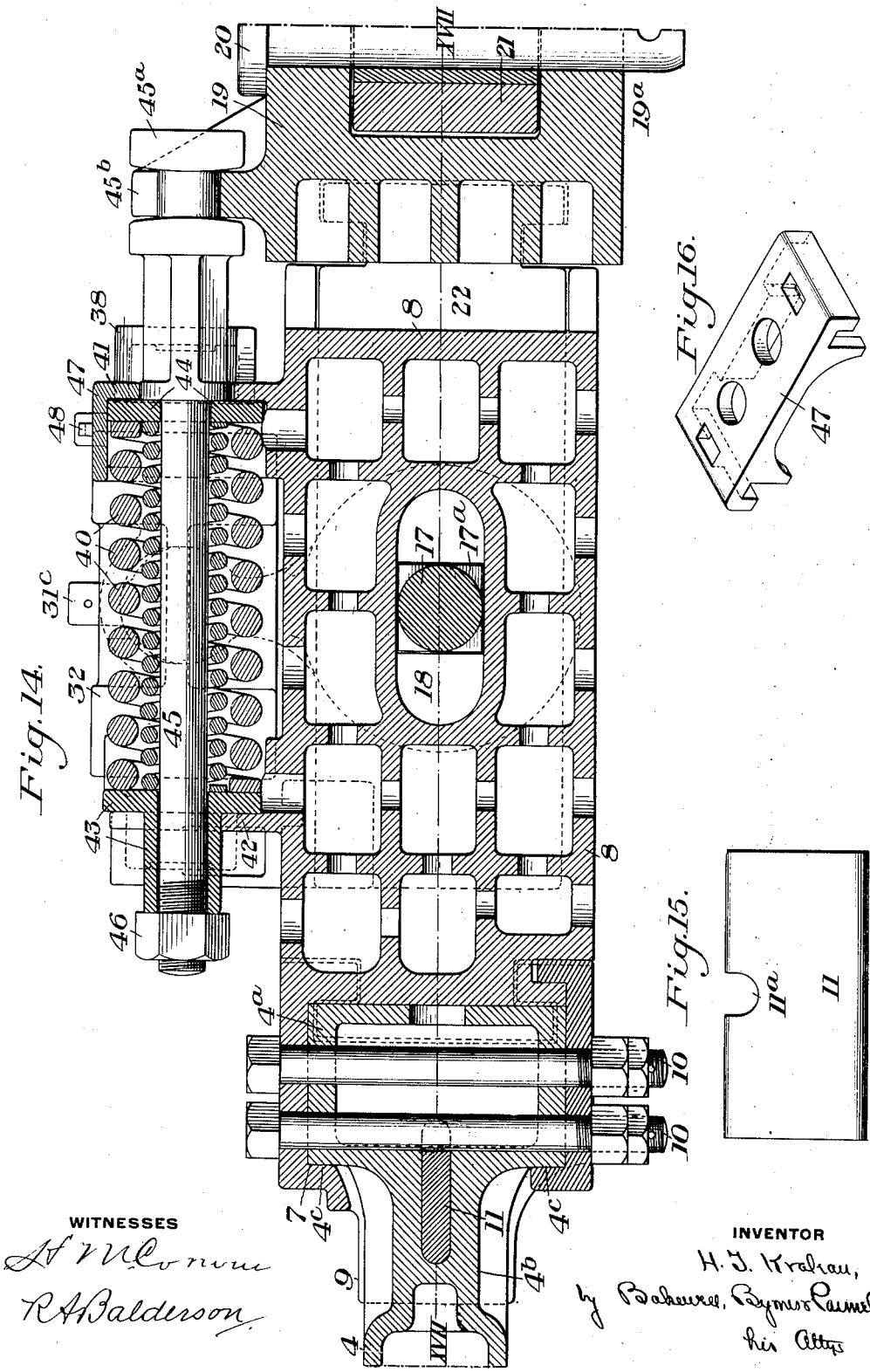
WITNESSES
INVENTOR

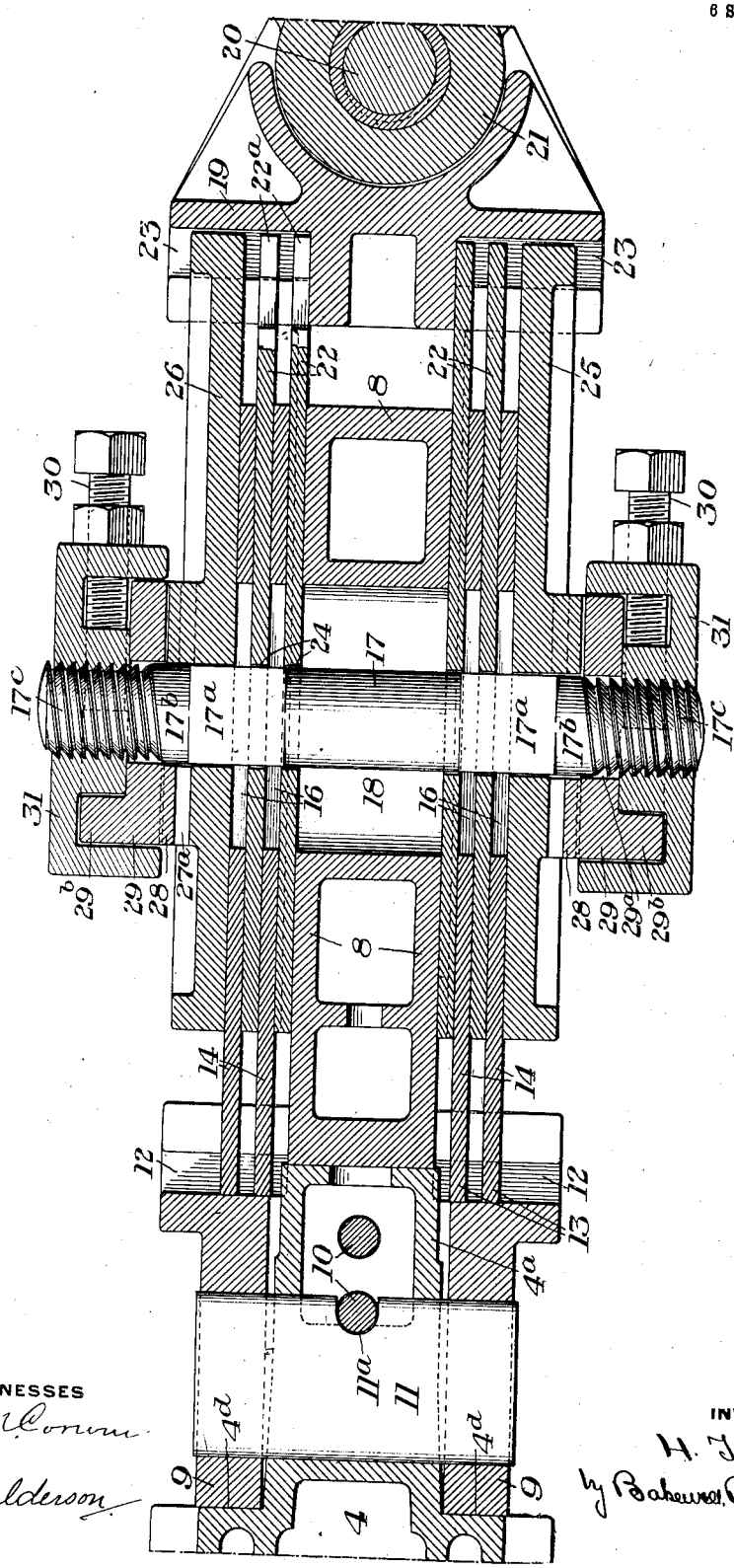

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

COUPLING-BRAKE OR DRAFT-RIGGING.

1,063,699.  Specification of Letters Patent.  Patented June 3, 1913.

Application filed June 6, 1911. Serial No. 631,621.

*To all whom it may concern:*

Be it known that I, HARRY T. KRAKAU, a citizen of the United States, and a resident of Cleveland, Cuyahoga county, Ohio, have invented a new and useful Improvement in Coupler-Brakes or Draft-Rigging, of which the following is a full, clear, and exact description, reference being had to the accompanying drawings, forming part of this specification, in which—

Figure 1 is a view, partly in plan and partly in horizontal section, showing my invention as applied to a railway car, certain portions only of the car structure being shown; Fig. 2 is a view of the same partly in side elevation and partly in section; Figs. 3 and 4 are detail perspective views showing respectively one of the front and rear friction plates or members; Fig. 5 is a side view of one of the outside friction plates, looking at the inner side of the same; Fig. 6 is a section on the line VI—VI of Fig. 5; Fig. 7 is a view similar to Fig. 5, but showing the other outside friction plate; Fig. 8 is a section on the line VIII—VIII of Fig. 7; Fig. 9 is a plan view of the coupler brake on a larger scale with some of the parts broken away; Fig. 10 is a view partly in side elevation and partly in vertical section, and showing the parts shown in Fig. 9; Fig. 11 is a section on the line XI—XI of Fig. 10; Fig. 12 is an inside face view showing one of the lever members and its slack adjuster; Fig. 13 is a sectional view of the device as shown in Fig. 12; Fig. 14 is a longitudinal vertical section on the line XIV—XIV of Fig. 1; Fig. 15 is a detail view of a key hereinafter more fully described; Fig. 16 is a detail perspective view of one of the parts hereinafter described; and Fig. 17 is a horizontal section on the line XVII—XVII of Fig. 14.

My invention has relation to draft rigging apparatus in the nature of a coupler brake and is designed to provide apparatus of this character capable of exerting a very powerful frictional resistance in which the friction generating pressure is obtained by the combined action of a screw or circular wedge and a lever.

A further object of my invention is the creation of a frictional pressure upon longitudinally movable friction elements through the medium of springs acting upon combined levers and wedges in such manner that the frictional resistance developed will at all times be proportional to the amount of travel of the drawbar. The force is applied by the longitudinal movement of the coupler, as in ordinary draft rigging, but instead of being transmitted by some longitudinally moving parts to inclines or their equivalents, to produce lateral pressure on friction surfaces, it is applied to the end of a lever as in the case of an ordinary brake, the rotation of the brake lever applying the force at its lower end or hub and causing a rotary movement upon each other of inclined surfaces which by reason of the length of the lever arm, can be so steeply inclined that there is no tendency to stick and jump. The leverage acting upon these inclines produces a transverse pressure upon longitudinally movable friction surfaces which can be graduated to stop the most extreme force which is applied, within the limited space provided for movement. This result is novel as applied to draft riggings and is obtained by means of the novel construction of brake levers and inclined planes acting together, the effectiveness of the inclined plane being largely increased by means of the lever. The required resistance can be accurately determined in proportion to the force and the length of movement, which is not the case with ordinary draft rigging.

My invention also comprises a novel means for taking up the wear of the parts as well as other features of construction hereinafter more fully described.

The nature of my invention may be best understood by reference to the accompanying drawings, in which I have shown the preferred embodiment thereof and which will now be described. It will be understood, however, that although I have illustrated my invention as applied to and built as a part of a radially swinging draft gear, for which it can be very compactly designed, it is equally applicable to other forms of draft gear, whether the coupler is provided with a radial movement or not, it being premised that various changes may be made in the details of construction and arrangement and combination of the several parts by those skilled in the art, without departing from the spirit and scope of my invention as defined in the appended claims. For instance, in Fig. 1, although the center sills are shown as spaced apart forward of the body bolster to provide room for lateral movement of the draft gear, these center sills can be run straight through the car, as they will not interfere with the longitudinal operation of the coupler brake, when radial movement of the coupler is not required, the pivotal connection with the car, in such cases, merely providing for free lateral displacement of the coupler to the slight extent provided for.

In these drawings, the numeral 2 designates a coupler of the automatic type, having a pivoted knuckle 3 and a rearwardly extending shank 4; the numeral 5 designates a suitable hanger or support for the shank 4 which is in turn supported from the end sill of the car by means of a casting 6. The shank 4 is formed with an enlarged portion $4^a$ at its rear end which fits within a pocket 7 at the forward end of the coupler shank extension or draft member 8, this pocket being bifurcated to form forwardly extending jaws 9 which embrace the reduced portion $4^b$ of the coupler shank and have buffing engagement with the shoulders $4^d$, and pulling engagement with the shoulders $4^c$. The enlarged portion of the coupler shank is shown as secured to the coupler shank extension or draft member by means of the two vertical bolts 10, and by the transverse key 11 (see Figs. 14, 15 and 17), this key having a notch or recess $11^a$ in its rear edge which engages the adjacent bolt 10. In assembling the parts the key is inserted before the insertion of the bolts.

The shank extension 8 is formed near its forward end with T slots 12 (see Figs. 10 and 17) to receive the T-head ends 13 of a series of front friction plates 14. One of these friction plates is shown in detail in Fig. 3. A set of these friction plates is arranged at each side of the shank extension, each of these plates being slotted longitudinally, as shown at 16, to permit of their back and forth movement over a transverse lever shaft 17, the coupler shank extension also having a longitudinal elongated slot 18 through which the central portion of the lever shaft 17 extends. These slots 16 and 18 are provided in order to enable the coupler shank extension, with its attached parts, including the friction plates 14, to move forward and back with the coupler in draft and buffing, the lever shaft 17 and the rear friction elements presently to be described remaining stationary relative to the car in so far as longitudinal movement is concerned.

19 designates a carrier for the series of rear friction plates, this carrier being shown as a casting bifurcated at its rear end to form upper and lower jaws $19^a$, a vertically extending pivot pin 20 passing through holes in these jaws and through a hole in a pivot casting 21 rigidly secured to the car under-framing. The casting 19, although preferably capable of pivotal movement in a horizontal plane, whereby it permits all the parts in front of it to swing radially, is rigid with the car with respect to longitudinal movement, so that the rear friction plates carried thereby are also rigid with respect to longitudinal movements. These rear friction plates are designated at 22, being interlapping and alternately arranged with the rearwardly extending portions of the front friction plates 14, at each side of the coupler shank extension, as clearly shown in Fig. 17. They are similar in form to the friction plates 14, having the T-heads $22^a$ at their rear ends which fit the T-shaped slots 23 in the carrier 19. Instead of elongated slots 16 for the lever shaft 17, they are provided with angular openings 24 to fit the angular portions $17^a$ of said lever shaft.

25 and 26 designate outside friction plates, the friction plate 25 being on what is termed the buffing side of the device, while the friction plate 26 is at the pulling side. These plates are shown in detail in Figs. 5 to 8, inclusive. The outside friction plate 25 has at its rear end the T-shaped projection $25^a$ for engagement with one of the T-slots 23 of the carrier 19, and its body portion has a plane surface on the side which faces inwardly, and projecting at right angles to said surface are ledges or ribs $25^b$, which form inwardly projecting guides for the upper and lower edges of the front and rear friction plates on the buffing side. The outside of the body portion is preferably ribbed for stiffness; and substantially at the center thereof there is a horizontally disposed hole $25^c$, having one portion square in cross-section and the other portion circular, for engagement with the corresponding portions $17^a$ and $17^b$ of the lever shaft 17. The engagement of the square portion of the hole with said shaft serves to prevent rotation of the shaft. Concentric with the hole $25^c$ is a cylindrical seat 27 with wedge-shaped radial teeth $27^a$ at the bottom thereof, adapted to engage similar wedge-shaped teeth 28 upon the inner surface of a slack-adjusting cam 29, which cam has a round hole $29^a$ therein to accommodate the adjacent round portion $17^b$ of the lever shaft extending therethrough.

The outside friction plate 26 at the pulling side of the rigging is of similar construction to the corresponding plate 25 on the buffing side. It is provided with suitable ribs $26^b$ which form inwardly projecting guides for the upper and lower edges of the front and rear friction plates on the pulling side. Substantially at the center thereof there is a longitudinally disposed hole 26ᶜ having one portion squared in cross-section and the other portion circular for the engagement with the corresponding portions 17ᵃ and 17ᵇ of the lever shaft 17, and the engagement of the square portion of the hole 26ᶜ with the shaft 17 serves to prevent the rotation of the shaft. Concentric with the hole 26ᶜ is a cylindrical seat with wedge shaped radial teeth at the bottom thereof adapted to engage similar shaped teeth upon the inner surface of the slack adjusting cam 29, which has an aperture 29ᵃ therein to accommodate the adjacent round portion 17ᵇ of the shaft extending therethrough. These slack-adjusting cams are adapted to be rotated within their seats and are held in the desired adjustment by means of set screws 30 which pass through friction levers 31. The inner ends of the set screws are arranged to engage the offset portions 29ᵇ of the slack-adjusters. The construction is such, it will be seen, that the slack adjusters will be caused to move with the friction levers but can be rotated adjustably relative thereto, whereby any slack between the interlapping friction plates can be taken up and held so that the levers may always be held in upright position, and yet there will be no appreciable looseness to be taken up by their rotation before they begin to clamp.

The outer ends of the lever shaft 17 are threaded, as shown at 17ᶜ (see Fig. 17), the threads preferably being double-pitch threads of trapezoidal form in order to give maximum strength, and both ends of the shaft preferably having right-hand threads. The levers 31 are threaded on these threaded ends of the lever shaft. Each lever has an upwardly extending lever arm 31ᵃ projecting from its hub portion, and terminating in a cylindrical enlargement 31ᵇ, topped by a boss 31ᶜ. Mounted upon the cylindrical portion of each of these lever arms is a spring-seating member which slips down over the boss 31ᶜ, the spring seat on the pulling side being designated at 32 and that on the buffing side at 33. These two members differ from each other mainly in their spring-seating end portions, which are of different sizes to accommodate the different sizes of springs 34 and 35 on the buffing and pulling sides respectively. The springs on the buffing side are considerably more powerful than those on the pulling side. The purpose of this is to provide the device with considerably greater capacity for frictional resistance in buffing than in pulling, for the reason that buffing forces in actual service are considerably in excess of draft or pulling forces. Since the clamping action put upon the friction plates, and hence the frictional resistance of the said plates, is directly proportional to the pressure put upon the ends of the levers 31, which causes the clamping (as will hereinafter more clearly appear), it is obvious that the more powerful springs on the buffing side will cause a more powerful clamping action, and hence more powerful frictional resistance. The sockets of the spring-seating members 32 and 33 are elongated slightly in a vertical direction to provide for a sliding movement between the levers and sockets, whereby the sockets may move in substantially horizontal lines, while the ends of the levers travel in an arc of a circle.

The rear spring 34 on the buffing side bears at its rear end against a spring-seating member 36, which is cast integral with, or is otherwise rigidly secured to the outside friction plate 25. (See Figs. 7 and 9.) The front spring 34 on the buffing side bears at its forward end against a spring-seating member 37, which is rigid with the coupler shank extension casting.

The springs 35 on the pulling side, as will be understood from the foregoing and from the drawings, are located at the opposite side of the center line of the coupler from the springs on the buffing side. The forward spring 35 bears at its forward end in a pocket of a spring-seating member 38, which is rigidly, but preferably removably secured to the outside friction plate 26. The rear spring 35 on the pulling side bears at its rear end against the spring-seating member 39, which is rigidly secured to the shank extension casting.

The numeral 40 designates a restoration spring which is seated between bosses or prongs 41 and 42 on the shank extension, a front follower 43 being interposed between the front end of said spring and the boss 42, while a rear follower 44 is interposed between the rear end of the spring and the rear boss 41. The main function of this spring, as its name indicates, is that of restoration of the parts to their normal position after the removal of the buffing or pulling stress, but it has a further function, viz., that of centering the entire draft gear vertically, which will be obvious from its method of connection to the coupler shank extension and to the casting 19. It will be evident by referring to Fig. 14 that this restoration spring, by being placed under initial compression can be caused to hold the coupler shank in horizontal position even though there be looseness in the parts which would ordinarily allow the forward end of the coupler to droop to the extent permitted by the hanger or support 5. The rear end of the tail bolt of the restoration spring has a fixed point of support on the upper portion of the casting 19, and the forward end of the restoration spring, by pressing against the forward boss 42 of the shank extension, will serve to lift and hold the coupler and attached parts in a horizontal position even if otherwise unsupported.

Inclosed by the restoration spring, and by both front and rear followers is a plunger 45, whose head 45$^a$ engages a lug 45$^b$, on the rear friction plate carrier 19; while the forward end of the plunger is in the form of a threaded rod having a nut 46 seating backwardly against the front follower, whereby the spring may be compressed between the nut and head of the plunger until its front and rest followers will rest in the bosses provided for them on the upper side of the shank extension, as before described. The restoration spring, plunger, and the followers are locked in position by means of the spring cover 47 (see Figs. 14 and 16), which is placed in position upon the upwardly projecting prongs of the rear spring seat and is keyed thereto by means of the keys 48.

The operation is as follows: In buffing, the coupler, together with the shank extension, moves rearwardly. In so doing, the shank extension carrier rearwardly with it the forward friction plates. At the same time, the forward spring on the buffing side will be compressed by the rearwardly advancing spring seat 37, and the upwardly extending lever arm 31 on the buffing side will be moved rearwardly a slight amount. This causes the hub portion of the said lever to move inwardly on the screw-threaded end portion 17$^c$ of the shaft 17, and thereby exert a powerful clamping action on the friction plates. This action is further augmented by reason of the fact that the slack adjuster came 29, on the buffing side is caused to rotate just as much as the lever 31 on that side rotates, whereby its wedge surfaces engage the wedges on the corresponding surfaces on the outside friction plate 25, thus increasing and assisting the wedge action of the screw threads upon the shaft. The combined results of these two actions is to cause the outside friction plate 25 on the buffing side to travel inwardly a slight amount to exert a powerful friction stress upon both the front and rear friction plates, the former of which are being forced rearwardly by the rearward movement of the shank extension. It will be understood, of course, that the rear friction plates, outside friction plates, the levers, and the lever shaft, remain immovable with respect to longitudinal movement; although during the buffing action, the lever on the buffing side rotates very slightly, by an amount sufficient to clamp the friction plates tightly together and produce the necessary frictional engagement. The lever upon the pulling side, during the buffing movement, is not caused to rotate.

During the buffing action just described, the restoration spring is being compressed; since its plunger is held immovable by reason of the engagement of its head with the abutment upon the rear friction plate support casting, which casting is rigid as respects longitudinal movement relative to the car. The front boss integral with the shank extension travels rearwardly and compresses this spring, the rear end of the spring being prevented from rearward movement by the engagement of its rear follower with the head of the plunger, the plunger remaining motionless. Upon the removal of the buffing force, the forward spring on the buffing side relieves its tension by pushing forwardly against the spring seat 37, thereby helping to restore the coupler to its normal longitudinally central position. At the same time, the restoration spring tends to relieve its compression by pushing forwardly against its front seat, thereby restoring the shank extension and the coupler to their normal positions longitudinally of the car, the shank extension drawing forwardly again with it the interlocked forward friction plates.

During the action of buffing, just described, both of the springs upon the pulling side remain idle and exert no force upon the lever at that side; also the rear spring on the buffing side is practically idle and is only compressed by the very small amount of rearward rotation of the upper end of the lever on the buffing side.

In pulling, the coupler and its attached shank extension move forwardly and in so doing, the forward friction plates are also drawn ahead, being engaged with the shank extension. Simultaneously the spring seat 39, which is integral with the shank extension, travels forwardly and compresses the rear spring on the pulling side against the rear side of the lever arm of the lever 31 on the pulling side. This causes said lever to rotate slightly and to exert a powerful pressure through the lever shaft, and with the assistance of the slack adjuster, as before described, upon the friction plates. During this action, the front spring on the pulling side remains idle except to the extent of the slight compression put upon it by the slight forward rotation of the upper end of the lever on the pulling side. Both of the springs of the buffing side remain idle, and the lever on the buffing side is not caused to rotate, but only forms an abutment to receive the increased pressure put upon it by the rotating lever on the pulling side. The restoration spring is compressed, by reason of the fact that the boss 41 of the shank extension advances forwardly with the shank extension against the rear end of said spring, while its forward end is held from forward movement by the front follower 43. The plunger is held against forward movement by the engagement of its head with the abutment 45$^b$ on the rear friction plate support casting, as before described. Upon the release of the pulling force, the restoration spring restores the coupler shank extension and the forward friction plates to their normal position longitudinally of the car, being assisted in this action by the rear spring on the pulling side, which tends to return to its normal position, and thereby pushes rearwardly upon the boss 39 which is integral with the shank extension. In each instance the springs on the buffing side on either side of one lever arm, and the springs on the pulling side on either side of the other lever arm, are under equal compression and thereby restore each of said levers to a normal vertical position after the removal of disturbing forces.

It is obvious that after wear has taken place, it will be necessary for either lever, when exerting a clamping pressure, to travel an excessive amount in order to take up the slack between the friction plates. The amount of this rotation might become so great that the lever would be in danger of getting out of engagement with the springs which cause its rotary movement. To obviate this difficulty, the slack adjusters before described have been provided, and by means of which any looseness can be taken up by a simple screwing up of one of the slack adjuster bolts, and a slackening of the other bolt by a similar amount, as will be readily apparent from Fig. 12. The slack adjuster being thus locked in the new position, takes up the wear in a direction parallel to the axis of the lever shaft, and leaves each lever ready to exert a clamping action the instant that force is applied to its upper end.

The advantages of my invention will be apparent to those skilled in the art. It provides a device capable of exerting a very powerful frictional resistance under both buffing and pulling stresses, and in which the resistance to buffing stresses may be increased relatively to the resistance under pulling stresses, to any desired extent in order to accord with the very much more powerful buffing forces which occur in actual service.

It will be noted that the innermost friction plates bear frictionally against the coupler shank extension which extension in so far as friction is concerned, acts as a plate in itself and takes part in the frictional action. It will further be noted from the form of the device illustrated, that my application provides a frictional draft rigging which may be readily applicable to a radially swinging draft gear, of which it may form an inseparable part. Heretofore it has usually been the custom to provide some telescoping casing arrangement within which a suitable draft rigging could be placed, but in the form of my invention illustrated, the friction draft rigging is built as a part of the radial draft gear and a great saving in weight is accomplished by the resultant elimination of unnecessary castings.

The means for producing pressure or causing the desired frictional resistance, including a screw which is in the form of a circular wedge set transversely to the line of draft, with levers acting upon the screw and springs for actuating the levers, constitute a simple and powerful means for the purpose. The provision of slack adjusting means for taking up the looseness between the parts caused by wear, and the provision of the restoration spring for both the restoring and centering function, are also features of importance in the operation of the device as will be understood from the foregoing description.

It will be obvious that many changes can be made in the construction and arrangement of the parts. Thus, the manner of seating and arranging the friction members, their connection and support, the arrangement of the springs on the buffing and pulling sides and of the restoration springs, and the manner in which said springs are caused to act to produce increased friction resistance of the friction elements, may all be widely varied without departing from the spirit and scope of my invention as defined in the appended claims.

I claim:

1. In apparatus of the character described, interlapping friction elements, and means for producing frictional pressure between said elements, said means comprising an operatively associated wedge and lever; substantially as described.

2. In apparatus of the character described, interlapping friction elements, and means for producing frictional pressure between said elements, said means comprising an operatively associated wedge and lever, together with spring means engaging said lever to actuate the same; substantially as described.

3. In apparatus of the character described, interlapping friction elements, and means for producing frictional pressure between said elements, said means comprising an operatively associated wedge and lever device, means for actuating said device under buffing movements, and other wedge and lever means actuated by pulling movements; substantially as described.

4. The combination with a coupler having a shank extension, of a plurality of interlapping friction members, a screw shaft, levers mounted on said shaft and arranged to exert a clamping action on the friction members, and springs engaged with the levers and with the shank extension to actuate the levers in pulling and buffing movements respectively; substantially as described.

5. The combination with a coupler having a shaft extension, of a plurality of interlapping friction members, a screw shaft, levers mounted on said shaft and arranged to exert a clamping action on the friction members, and springs engaged with the levers and with the shank extension to actuate the levers in pulling and buffing movements, one of said levers operating under buffing stresses and the other under pulling stresses; substantially as described.

6. The combination with a coupler having a rearwardly extending longitudinally movable shank extension, a plurality of friction members engaged with said shank extension to move longitudinally therewith, another set of friction members, a carrier therefor fixed with respect to longitudinal movement, a screw shaft arranged transversely of the line of draft, levers engaging the screw shaft and arranged to exert a clamping action upon the frictional members, and spring means engaged with the levers and arranged to operate the same under buffing and pulling movements of the shank extension respectively; substantially as described.

7. Apparatus of the character described, having interlapping friction elements, a shaft, a lever engaging said shaft, and spring means engaging the lever to actuate the same together with actuating devices for the spring means; substantially as described.

8. In apparatus of the character described, the combination with a longitudinal coupler shank extension, of a friction draft rigging associated therewith and composed of a plurality of intercalated friction members, levers arranged to exert a clamping action upon the friction members, and spring means for actuating the levers; substantially as described.

9. The combination with a longitudinally movable draft member, of a friction draft rigging, associated therewith, and having a plurality of laterally shiftable friction elements, levers for exerting a clamping action upon the friction elements, spring means arranged to actuate one of said levers under pulling stresses on the draft member, and other spring means for actuating the other lever under buffing stresses on the draft member; substantially as described.

10. The combination with a longitudinally movable draft member, of a friction draft rigging associated therewith, and having a plurality of laterally shiftable friction elements, levers for exerting a clamping action upon the friction elements, spring means arranged to actuate one of said levers under pulling stresses on the draft member, and other spring means for actuating the other lever under buffing stresses on the draft member, together with a restoring spring; substantially as described.

11. The combination with a longitudinally movable draft member having a coupler attached thereto, of a friction draft rigging associated with the draft member and composed of two sets of interlapping friction elements, the elements of one set being capable of a longitudinal movement with respect to the elements of the other set, said elements being also capable of lateral shifting, a shaft extending transversely through said elements and having threaded end portions, levers engaging such threaded end portions, and spring means engaging the levers to actuate the same respectively under buffing and pulling stresses on the draft members; substantially as described.

12. The combination with a longitudinally movable draft member, of a friction draft rigging associated therewith and composed of a plurality of relatively movable friction elements, two levers arranged to exert clamping action upon the friction elements and arranged at opposite sides of the center line of the draft member, and spring seats engaging said levers, springs bearing against the spring seats, and means acting to compress one set of springs under buffing stresses and to compress the other set of springs under pulling stresses; substantially as described.

13. The combination with a longitudinally movable draft member, of a friction draft rigging associated therewith and composed of a plurality of relatively movable friction elements, two levers arranged to exert clamping action upon the friction elements and arranged at opposite sides of the center line of the draft member, and spring seats engaging said levers, springs bearing against the spring seats, and means acting to compress one set of springs under buffing tresses and to compress the other set of springs under pulling stresses, together with a restoring spring arranged to be compressed by both buffing and pulling movements of the draft member; substantially as described.

14. The combination with a longitudinally movable draft member, of a friction draft rigging associated therewith and composed of a plurality of relatively movable friction elements, two levers arranged to exert clamping action upon the friction elements and arranged at opposite sides of the center line of the draft member, and spring seats engaging said levers, springs bearing against the spring seats, and means acting to compress one set of springs under buffing tresses and the other set of springs under pulling stresses, together with a restoring spring arranged to be compressed by both buffing and pulling movements of the draft member, said restoring spring being located between the first named springs; substantially as described.

15. The combination with a draft member, of a friction draft rigging associated therewith and comprising two sets of friction members capable of relative longitudinal movement, and also to be moved laterally toward and away from each other, levers arranged to exert a clamping action upon said elements under buffing and pulling stresses respectively on the draft member, and slack adjusting devices arranged to take up lateral looseness between said elements; substantially as described.

16. The combination with a longitudinally movable draft member, of a friction draft rigging associated therewith and comprising two sets of friction elements, the said sets being adapted to be moved longitudinally relative to each other, a shaft passing transversely through the said elements and having threaded ends, upwardly extending levers having threaded engagement with the threaded ends of said shaft and arranged to cause a clamping action upon the friction elements; buffing and pulling springs engaged with the upper ends of said levers, and abutments for said springs, the pulling springs comprising means for actuating one of said levers under pulling stress, and the buffing springs comprising means for actuating the other lever under buffing stress, substantially as described.

17. In apparatus of the character described, a friction device having friction elements capable of being moved laterally into increased frictional contact with each other, a threaded shaft, a lever mounted on said shaft to turn about the center thereof and also to move in the direction of the axis of said shaft, and means for actuating said lever; substantially as described.

18. In apparatus of the character described, a friction device having friction elements capable of being moved laterally into increased frictional contact with each other, a threaded shaft, a lever mounted on said shaft to turn about the center thereof and also to move in the direction of the axis of said shaft, and means for actuating said lever, together with a slack adjusting device carried by the lever, and means for adjusting said device; substantially as described.

In testimony whereof, I have hereunto set my hand.

HARRY T. KRAKAU.

Witnesses:
CHESTER K. BROOKS,
HARRY E. ORR.